(12) United States Patent
Heller, Jr.

(10) Patent No.: US 8,667,231 B2
(45) Date of Patent: *Mar. 4, 2014

(54) TRANSACTIONAL MEMORY SYSTEM WITH EFFICIENT CACHE SUPPORT

(71) Applicant: International Business Machines Corporation, Armonk, NY (US)

(72) Inventor: Thomas J. Heller, Jr., Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/656,778

(22) Filed: Oct. 22, 2012

(65) Prior Publication Data

US 2013/0046937 A1    Feb. 21, 2013

Related U.S. Application Data

(63) Continuation of application No. 12/550,844, filed on Aug. 31, 2009.

(51) Int. Cl.
*G06F 12/00* (2006.01)

(52) U.S. Cl.
USPC ............ 711/150; 711/163; 711/152; 711/125

(58) Field of Classification Search
None
See application file for complete search history.

(56) References Cited

U.S. PATENT DOCUMENTS

| | | |
|---|---|---|
| 3,686,641 A | 8/1972 | Logan et al. |
| 5,428,761 A | 6/1995 | Herlihy et al. |
| 5,438,761 A | 8/1995 | Krumszyn et al. |
| 5,553,291 A | 9/1996 | Tanaka et al. |
| 5,701,432 A | 12/1997 | Wong et al. |
| 5,742,785 A | 4/1998 | Stone et al. |
| 5,946,711 A | 8/1999 | Donnelly |

(Continued)

FOREIGN PATENT DOCUMENTS

| | | |
|---|---|---|
| EP | 1643371 A2 | 4/2006 |
| JP | 2006107494 A | 4/2006 |
| WO | 2007067390 A2 | 6/2007 |

OTHER PUBLICATIONS

Ananian, Unbounded Transactional Memory, Dec. 31, 2005, IEEE, 11th Int'l Symposium on HPCA.*

(Continued)

*Primary Examiner* — Reginald Bragdon
*Assistant Examiner* — Baboucarr Faal
(74) *Attorney, Agent, or Firm* — Cantor Colburn LLP; John Campbell

(57) ABSTRACT

A computer implemented method for use by a transaction program for managing memory access to a shared memory location for transaction data of a first thread, the shared memory location being accessible by the first thread and a second thread. A string of instructions to complete a transaction of the first thread are executed, beginning with one instruction of the string of instructions. It is determined whether the one instruction is part of an active atomic instruction group (AIG) of instructions associated with the transaction of the first thread. A cache structure and a transaction table which together provide for entries in an active mode for the AIG are located if the one instruction is part of an active AIG. The next instruction is executed under a normal execution mode in response to determining that the one instruction is not part of an active AIG.

6 Claims, 9 Drawing Sheets

(56) References Cited

U.S. PATENT DOCUMENTS

| | | | |
|---|---|---|---|
| 5,963,922 | A | 10/1999 | Helmering |
| 5,974,438 | A | 10/1999 | Neufeld |
| 6,035,379 | A | 3/2000 | Raju et al. |
| 6,052,695 | A | 4/2000 | Abe et al. |
| 6,078,999 | A | 6/2000 | Raju et al. |
| 6,360,220 | B1 | 3/2002 | Forin |
| 6,360,231 | B1 | 3/2002 | Pong et al. |
| 6,381,676 | B2 | 4/2002 | Aglietti et al. |
| 6,510,498 | B1 | 1/2003 | Holzle et al. |
| 6,611,906 | B1 | 8/2003 | McAllister et al. |
| 6,651,146 | B1 | 11/2003 | Srinivas et al. |
| 6,738,837 | B1 | 5/2004 | Wyland |
| 6,748,505 | B1 | 6/2004 | Dakhil |
| 6,826,757 | B2 | 11/2004 | Steele, Jr. et al. |
| 6,862,664 | B2 | 3/2005 | Tremblay et al. |
| 6,874,065 | B1 | 3/2005 | Pong et al. |
| 6,880,045 | B2 | 4/2005 | Pong et al. |
| 6,880,071 | B2 | 4/2005 | Steele, Jr. et al. |
| 6,938,130 | B2 | 8/2005 | Jacobson et al. |
| 6,981,110 | B1 | 12/2005 | Melvin |
| 7,000,234 | B1 | 2/2006 | Shavit et al. |
| 7,017,160 | B2 | 3/2006 | Martin et al. |
| 7,039,794 | B2 | 5/2006 | Rodgers et al. |
| 7,089,374 | B2 | 8/2006 | Tremblay et al. |
| 7,107,402 | B1 | 9/2006 | Melvin |
| 7,117,502 | B1 | 10/2006 | Harris |
| 7,178,062 | B1 | 2/2007 | Dice |
| 7,689,788 | B2 | 3/2010 | Moir et al. |
| 7,730,286 | B2 | 6/2010 | Petersen et al. |
| 7,865,701 | B1 | 1/2011 | Tene et al. |
| 2002/0072071 | A1 | 6/2002 | Kientsch-Engel et al. |
| 2002/0073071 | A1 | 6/2002 | Pong et al. |
| 2002/0078308 | A1 | 6/2002 | Altman et al. |
| 2002/0103804 | A1 | 8/2002 | Rothschild et al. |
| 2002/0143847 | A1 | 10/2002 | Smith |
| 2002/0161815 | A1 | 10/2002 | Bischof et al. |
| 2002/0199069 | A1 | 12/2002 | Joseph |
| 2003/0066056 | A1 | 4/2003 | Petersen et al. |
| 2003/0079094 | A1 | 4/2003 | Rajwar et al. |
| 2003/0084038 | A1 | 5/2003 | Balogh et al. |
| 2003/0204682 | A1 | 10/2003 | Ueno |
| 2004/0015642 | A1 | 1/2004 | Moir et al. |
| 2004/0034673 | A1 | 2/2004 | Moir et al. |
| 2004/0152948 | A1 | 8/2004 | Kim |
| 2004/0162948 | A1 | 8/2004 | Tremblay et al. |
| 2004/0187115 | A1 | 9/2004 | Tremblay et al. |
| 2004/0187116 | A1 | 9/2004 | Tremblay et al. |
| 2004/0187127 | A1 | 9/2004 | Gondi et al. |
| 2004/0267828 | A1 | 12/2004 | Zwilling et al. |
| 2005/0060559 | A1 | 3/2005 | McKenney |
| 2005/0086446 | A1 | 4/2005 | McKenney et al. |
| 2005/0097296 | A1 | 5/2005 | Chamberlain et al. |
| 2005/0131947 | A1 | 6/2005 | Laub et al. |
| 2005/0138298 | A1 | 6/2005 | Downer |
| 2005/0216625 | A1 | 9/2005 | Smith et al. |
| 2006/0085588 | A1 | 4/2006 | Rajwar et al. |
| 2006/0085591 | A1 | 4/2006 | Kumar et al. |
| 2006/0173885 | A1 | 8/2006 | Moir et al. |
| 2006/0200632 | A1 | 9/2006 | Tremblay et al. |
| 2006/0206692 | A1 | 9/2006 | Jensen |
| 2006/0212456 | A1 | 9/2006 | Earhart |
| 2006/0282476 | A1 | 12/2006 | Dolby et al. |
| 2006/0288173 | A1 | 12/2006 | Shen |
| 2006/0294326 | A1 | 12/2006 | Jacobson et al. |
| 2007/0028056 | A1 | 2/2007 | Harris |
| 2007/0028058 | A1 | 2/2007 | Bradley et al. |
| 2007/0186056 | A1 | 8/2007 | Saha et al. |
| 2007/0239942 | A1 | 10/2007 | Rajwar et al. |
| 2007/0282838 | A1 | 12/2007 | Shavit et al. |
| 2007/0300238 | A1 | 12/2007 | Kontothanassis et al. |
| 2008/0022054 | A1 | 1/2008 | Hertzberg et al. |
| 2008/0065864 | A1 | 3/2008 | Akkary et al. |
| 2008/0098181 | A1 | 4/2008 | Moir et al. |
| 2008/0288727 | A1 | 11/2008 | Baum et al. |
| 2008/0288730 | A1 | 11/2008 | Heller, Jr. et al. |
| 2009/0172292 | A1 | 7/2009 | Saha et al. |

OTHER PUBLICATIONS

Moore, LogTM: Log-Based Trasactional Memory, Nov. 15, 2006, IEEE, 12$^{th}$ Int'l Symposium on HPCA.*

Advantage Set Associativity; Computer Architecture: a Quantitative Approach, 3rd Edition, Hennessy et al.; Published 2003; p. 429—in U.S. Appl. No. 11/928,594.

Ananian et al.; "Unbounded Transactional Memory"; 11th International Symposium on High-Performance Computer Architecture; IEEE; Feb. 11, 2005-Feb. 15, 2005 (in U.S. Appl. No. 11/928,758), 4pgs.

Banatre et al., "Cache Management in a Tightly Coupled Fault Tolerant Multiprocessor", 1990 IEEE, pp. 1-8.

Chung et al. "Tradeoffs in Transactional Memory Virtualization", ASPLOS '06 Oct. 21-25, pp. 1-2.

Definition of Set Associative Cache; FOLDOC—dated: Oct. 18, 2004; in U.S. Appl. No. 11/928,594, 1 pg.

Definition of Virtual Memory—FOLDOC—dated: Nov. 26, 2002; in U.S. Appl. No. 11/928,594, 1 pg.

Dice et al., "Transactional Locking II", 2006 pp. 1-15.

U.S.P.T.O Communication, Final Rejection for U.S. Appl. No. 11/748,044 dated Nov. 10, 2009, 27pgs.

U.S.P.T.O Communication, Final Rejection for U.S. Appl. No. 11/928,533 dated Apr. 8, 2011, 20pgs.

U.S.P.T.O Communication, Final Rejection for U.S. Appl. No. 11/928,594 dated Jul. 9, 2010 55pgs.

U.S.P.T.O Communication, Final Rejection for U.S. Appl. No. 11/928,661 dated Aug. 27, 2010 36pgs.

U.S.P.T.O Communication, Final Rejection for U.S. Appl. No. 11/928,758 dated Jul. 9, 2010 66pgs.

U.S.P.T.O Communication, Final Rejection for U.S. Appl. No. 11/928,857 dated Jun. 8, 2011 33pgs.

Grinberg et al. "Investigation of Transactional Memory Using FPGAs"; School of Electrical Engineering; Tel Aviv University;; Tel Aviv Israel 2006—pp. 1-4.

Hammond et al., "Transactional Memory Coherence and Consistency", Stanford University, Jun. 21, 2004 pp. 1-2.

Hapner et al. "Java Message Service", Version 1.1, Sun Microsystems; Apr. 12, 2002, 140pgs.

Harris et al., "Language Support for Lightweight Transactions", ACM SIGPLAN Notices, vol. 38, No. 11, ACM; Dated: Nov. 2003, 15pgs.

Harris et al. "Transactional Memory with Data Invariants",TRANSACT~'06 2006, pp. 1-12.

Hennessy et al.; Computer Architecture: A Quantitative Approach (Third Edition); p. 530; Published 2003; (in U.S. Appl. No. 11/928,758).

Herlihy "What Can We Prove About Transactional Memory?" Feb. 16, 2007, Brown University, pp. 1-67.

Herlihy et al. "Transactional Memory: Architectural Support for Lock-Free Data Structures", 1993 IEEE, pp. 289-300.

Java.lang Class Thread; Sun Microsystems Apr. 5, 2003 9 (in U.S. Appl. No. 11/928,758), 28pgs.

Katz et al. "Implementing a Cache Consistency Protocol, Research Paper," Electrical Engineering and Computer Science Department, University of California Berkeley, 1985 pp. 1-31.

Kerns, Tamra, "The Advantages of Multithreaded Applications" copyright 1998 (U.S. Appl. No. 11/928,758 PTO-892) 3pgs.

Kongetira et al. "Niagara: A 32-Way Multithreaded Sparc Processor", 2005 IEEE, pp. 21-29.

Kuszmaul et al. "Transactions Everywhere" http://www.cs.wfsc.edu/-rajwar/tm-workshop/position_statements. htm Apr. 8, 2005, pp. 1-19.

L.C. Heller et al. "Millicode in an IBM zSeries Processor"; IBM Journal of Research and Development, vol. 48, No. 3/4, May/Jul. 2004, pp. 425-434.

Lee, "The Problem with Threads", Innovative Technology for Computing Professionals, May 2006, pp. 1-19.

(56) References Cited

OTHER PUBLICATIONS

Luchango et al. "Hybrid Transactional Memory", ASPLOS '06 Oct. 21-25, 2006; Sun Microsystems, Inc.; 11pgs.
MATE: Micro Assist Thread Engine; IPCOM000027405D; IBM 04-07-04 (in U.S. Appl. No. 11/928,758), 3pgs.
McDonald et al, "Architectural Semantics for Practical Transactional Memory", Computer Systems Laboratory Stanford University, 2006, pp. 1-12.
Mohamed "The Posix Interface for the Unicon Programming Language", http://www.drones.com/unicon Aug. 7, 2012, pp. 1-14.
Moore et al., LogTM: Log-Based Transactional Memory, Feb. 15, 2006, 12th Annual International Symposium on High Performance Computer Architecture (HPCA-12) 12pgs.
"Multithreaded Programming Guide" http://docs.sun.com/app.docs/doc/806-6867/6jfpgdcop?1=sv&a=view, Feb. 19, 2007 pp. 1-13.
"Multithreaded Programming Guide Products and Services", http://docsun.cites,uiuc.edu/sun_docs/C/solaris_9/SUNWdev/MTP/p56.html, Feb. 19, 2007, pp. 1-4.
"Native POSIX Thread Library", http://en.wikipedia.org/wiki/Native_POSIX_Thread_Library, Feb. 20, 2007, pp. 1-3.
U.S.P.T.O Communication, Non-Final Rejection for U.S. Appl. No. 11/748,044 dated Apr. 13, 2011 38pgs.
U.S.P.T.O Communication, Non-Final Rejection for U.S. Appl. No. 11/748,044 dated Apr. 14, 2010 38pgs.
U.S.P.T.O Communication, Non-Final Rejection for U.S. Appl. No. 11/928,661 dated Apr. 2, 2010 43pgs.
U.S.P.T.O Communication, Non-Final Rejection for U.S. Appl. No. 11/928,758 dated Apr. 16, 2010 62pgs.
U.S.P.T.O Communication, Non-Final Rejection for U.S. Appl. No. 11/928,857 dated Nov. 26, 2010 32pgs.
U.S.P.T.O Communication, Non-Final Rejection for U.S. Appl. No. 11/928,533 dated Oct. 29, 2010 32pgs.
U.S.P.T.O Communication, Non-Final Rejection for U.S. Appl. No. 11/928,594 dated Mar. 8, 2010 43pgs.
U.S.P.T.O Communication, Notice of Allowance for U.S. Appl. No. 11/748,044 mailed Jul. 19, 2012 10pgs.
U.S.P.T.O Communication, Notice of Allowance for U.S. Appl. No. 11/928,594 mailed May 25, 2011 57pgs.
U.S.P.T.O Communication, Notice of Allowance for U.S. Appl. No. 11/928,661 mailed May 18, 2011 21pgs.
U.S.P.T.O Communication, Notice of Allowance for U.S. Appl. No. 11/928,758 mailed Jun. 30, 2011 33pgs.
PCT/EP2010/062302—International Search Report dated Nov. 22, 2010 3pgs.
"Programming in the Age of Concurrency: Software: Software Transactional Memory", http://channel9.msdn.com/Showpost.aspx?postid=231495, Feb. 16, 2007 pp. 1-17.
Rajwar et al. "Speculative Lock Elision: Enabling Highly Concurrent Multithreaded Execution", 2001 IEEE, pp. 294-305.
Rajwar et al., "Virtualizing Transactional Memory", IEEE; ICSA'05 Proceedings of the 32nd International Symposium on Computer Architecture. 2005, pp. 1-12.
Saha et al. "Architectural Support for Software Transactional Memory"; 39th Annual IEEE/ACM International Symposium on Microarchitecture; Dec. 9-13, 2006; 12 pages.
Saha et al. McRT-STM—"A High Performance Software Transactional Memory System for a Multi-Core Runtime," Proceedings of the ACM SIGPLAN Symposium on Principles and Practice of Parallel Programming; Mar. 29-31, 2006; 11 pages.
Schmid, Patrick, Architecture Diagram of the Celeron Williamette; Tom's Hardware, Jun. 12, 2002; 3 pages.
"Securing Your Future with HP: A Transition Guide for Tru64 UNIX Customers", http://whitepapers,techrepublic.com.com/whitepaper.aspx?docid=275665&promo=100510, downloaded Feb. 19, 2007; pp. 1-3.
Shavit et al. "Software Transactional Memory", Annual ACM Symposium on Principles of Distributed Computing, Proceedings of Fourteenth Annual ACM Symposium on Principles of Distributed Computing; 1995; 34 pages.
Shriraman et al. "Hardware Acceleration of Software Transactional Memory", ACM SIGPLAN Workshop on Transactional Computing; May 18, 2006, pp. 1-10.
"Software Transactional Memory", Wikipedia, http://wikipedia.org/wiki/Software_transactional_memory ; dowloaded Feb. 19, 2007; pp. 1-6.
Soltis, "Inside the AS/400", 2nd Edition, Duke Press 2001; pp. 1-6.
Subject Matter Eligibility Test (M-OR-T) for Process Claims; USPTO (in U.S. Appl. No. 11/928,758); 1 page.
Wilson et al.. "The Case of Compressed Caching in Virtual Memory Systems"; Proceedings of the 1999 USENIX Annual Technical Conference; 1999; 16 pages.
"THREAD: (Computer Science)" Wikipedia, htt://en.wikipedia.org/wiki/Thread_(computer_science), downloaded Feb. 20, 2001; pp. 1-7.
"Tuple Space", http://c2.com/cgi/wiki?TupleSpace, downloaded Feb. 16, 2007; pp. 1-5.
Wheeler "Secure Programmer: Prevent Race Conditions", http://www-128.ibm.com/developerworks.linux/library/1-sprace.html ; Oct. 7, 2004; pp. 1-10.
Wood, "Transactional Memory—An Overview of Hardware Alternatives", Transactional Memory Workshop, Apr. 8, 2005, pp. 1-22.
Roetter, "Writing Multithreaded JAVA Applications", http://www-128.ibm.com/developworks/java/library/j-thread.html, Feb. 1, 2001; pp. 1-7.
Yen et al. LogTM-SE Decoupling Hardware Transactional Memory from Caches; Feb. 14, 2007; 13th Annual Internatioanl Symposium on High Performance Computer Architecture; 12 pages.

* cited by examiner

TRANSACTIONAL MEMORY SYSTEM WITH EFFICIENT CACHE SUPPORT

CROSS-REFERENCE TO RELATED APPLICATION

This application is a continuation of U.S. patent application Ser. No. 12/550,844, filed Aug. 31, 2009, the content of which is incorporated by reference herein in its entirety.

BACKGROUND

This invention relates generally to processing within a computing environment, and more particularly to a computing system with optimized support for transactional memory.

Current multiprocessor and multithreaded computing systems allow the performance of a single software application to be scaled to many times the possible performance of a single threaded application. Current software and hardware systems provide for the parallel processing of multiple threads of execution. Software applications can use existing thread libraries, such as the POSIX® pthread library, to control the creation of multiple threads of parallel execution. The use of multiple threads works well for applications that operate on easily partitioned tasks and data; course grain locks can be used to control access to the few shared data structures to prevent rare conflicts between the data updates of multiple threads.

Many software applications contain data structures that must be shared among multiple threads and have frequent concurrent inspections and updates of the shared data structures. These applications require additional modifications in order to obtain good scaling when using large numbers of threads. Applications which use multiple threads of execution that access shared data structures concurrently require the use of specialized data locking routines in order to produce a reliable outcome that is free from deadlocks and corrupted data. The majority of existing multithreaded applications in this category use fine grained software locks to achieve good performance and correct operation. Writing high performance multithreaded programs which use fine grained software locks is extremely difficult and requires expert programming skills. The lack of these skills in the software industry may limit the production of multithreaded applications which require the use of shared data structures and therefore the usefulness of multithreaded and multiprocessor computing systems for certain application classes, including many forms of transaction processing.

Various "transactional memory" systems have been proposed and built to provide a simpler programming model for constructing multithreaded applications that need to control access to shared data structures. These systems allow software running on one thread of execution to optimistically assume that shared data structures can be updated without conflict with the accesses and updates of other threads of execution. The speculative updates to memory are kept "pending" until the transactional memory system confirms that no conflicts with storage accesses of other threads have occurred. The transactional memory system must be able to discard the pending speculative updates when conflicts between the stored accesses of multiple threads are detected.

BRIEF SUMMARY

An exemplary embodiment is a computer implemented method for use by a transaction program for managing memory access to a shared memory location for transaction data of a first thread, the shared memory location being accessible by the first thread and a second thread. The method includes executing at a computing system a string of instructions to complete a transaction of the first thread, beginning with one instruction of the string of instructions. It is determined at the computing system whether the one instruction is part of an active atomic instruction group (AIG) of instructions associated with the transaction of the first thread. A cache structure and a transaction table which together provide for entries in an active mode for the AIG are located. The locating is in response to determining that the one instruction is part of an active AIG. An entry includes an old data state stored in the cache structure and control information stored in the transaction table. All storage locations inspected or modified by instructions of the active AIG remain pending until the computing system indicates that the storage locations should be committed. The next instruction is executed at the computing system under a normal execution mode in response to determining that the one instruction is not part of an active AIG.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
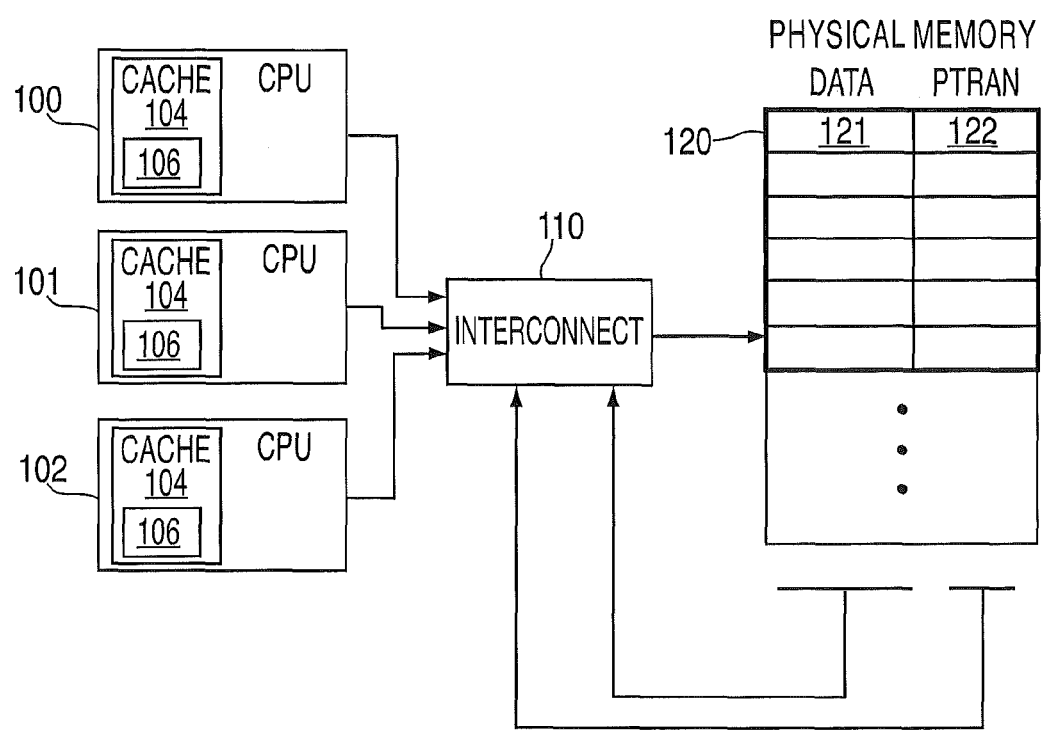
FIG. 1 illustrates a computing system with optimized transactional memory that may be implemented by an exemplary embodiment of the present invention.

An exemplary embodiment of the present invention is directed to a transactional memory system that combines a data cache structure (e.g., a hardware buffer) with a log based structure (e.g., a software table) to hold speculative transaction data. An exemplary embodiment provides for "old data states" to be stored in cache and eliminates the need to move "old data states" into the log based structure. However, in the event that the data cache structure cannot store the old data states (e.g., it becomes full), an exemplary embodiment provides for storing the old data states in the log based structure.

Exemplary embodiments provide a computing system which uses a combination of a "private-to-transaction" (PT- RAN) tag, attached to each increment of real system memory, a log of speculative loads and stores, and a data cache structure storing old data states associated with the speculative loads and stores to provide an improved implementation of a transactional memory system. An exemplary embodiment uses a log with the added mark bit employed as a PTRAN tag and associated with every increment of real system memory. Hardware is provided to quickly detect conflicts between the storage accesses of transactions running on multiple threads of execution. The use of the tag in memory and associated conflict detection hardware included in an exemplary embodiment of the present invention provides a much faster transactional memory system with much less overhead when compared to existing systems. The complexity of an exemplary embodiment is lower than prior attempts at using additional cache coherency states for conflict detection, especially for systems with large numbers of processors and associated interconnections.

An exemplary embodiment of the present invention uses a combination of the cache and the main memory array of the computing system to hold the speculative data (including both an old data state and control information) and can support very long transactions. An exemplary embodiment utilizes the cache to store old data states and the main memory array (also referred to herein as main storage or main memory) to store transaction and address information (e.g., control information) associated with the speculative loads and stores. In addition, the main memory array is utilized to store any overflow old data states that do not fit into the portion of the cache (e.g., a buffer) reserved for the old data states. As used herein the term "old data state" refers to the original non-speculative data at storage locations that are the targets of the store instructions inside of a transaction. An exemplary embodiment provides the ability to check the address of a new memory access without a long search process for common cases. Likewise, it is an improvement over software only transactional memory systems since the conflict detection and use of the tag in memory eliminates some of the software overhead associated with tracking the speculative state of transactions. It also provides the ability to detect storage conflicts at a very fine level (down to a single byte) as opposed to prior art software systems that track updates to entire software objects which may be hundreds or thousands of bytes. Existing software systems will either give frequent over-indication of potential data conflicts or incur very large software path length penalties when attempting to track the updates to individual components of software objects. A further advantage of eliminating the bandwidth required to do reading and writing to the main memory is realized by providing a cache location for storing old data states.

Figure 3:
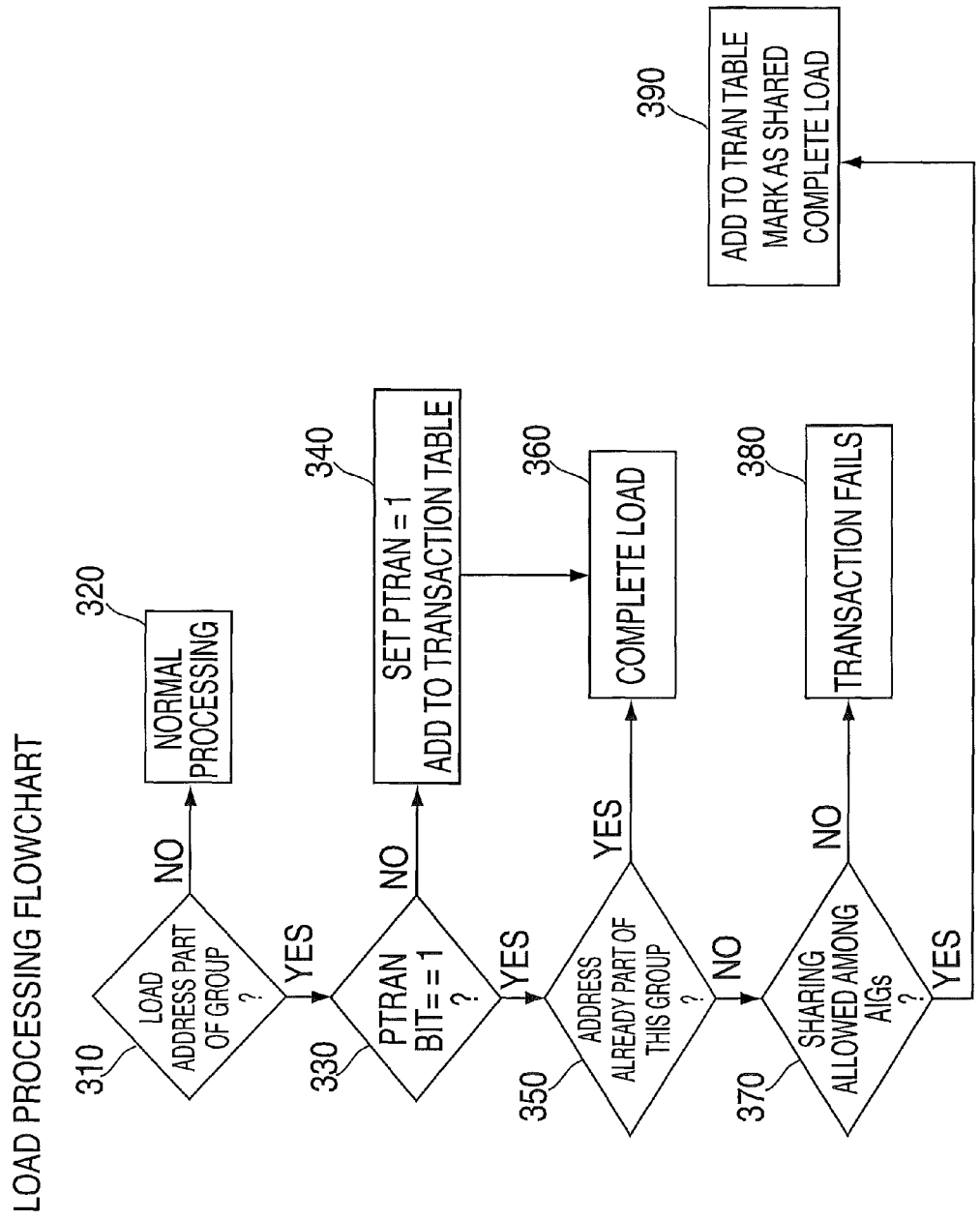
FIG. 3 illustrates a load processing flow that may be implemented by an exemplary embodiment.

Transactional memory systems have been proposed as illustrated by U.S. Pat. No. 7,536,517 (hereinafter the "'517 patent"), which teaches the use of software enlistment records associated with memory locations that have been accessed by transactions. The system described in the '517 patent also uses a "version value" in the "enlistment record". FIG. 3 of the '517 patent includes an operation "locate enlistment record of memory location." The text describing FIG. 3 gives the example of the enlistment record being part of a software object at the referenced memory address and being created with the use of a "software transactional memory interface." The '517 patent uses version numbers associated with each enlistment record and needs to deal with cases where the version number exceeds the maximum number supported by the enlistment record. In hindsight, after learning of the details of an exemplary embodiment of the present invention, it will be recognized that these features of the recent developments in transaction memory systems are not needed and can be improved upon.

Earlier, and now long ago, as pointed out in the development of fast paced computing systems developments summarized by David A. Wood, in his article entitled "An Overview of Hardware Alternatives" (Transactional Memory Workshop, Apr. 8, 2005) it was Chang and Mergen of IBM (described in 801 Storage: Architecture and Programming) who proposed using a lock bit associated with each segment of virtual memory. Their system provided an ability to detect concurrent accesses of storage locations by multiple threads but restricted the total number of concurrent threads that could operate on any single virtual memory segment when the transaction locking mechanism becomes active. Large virtual memory page tables which are required by Chang and Mergen to execute concurrent threads impose a performance penalty on all threads of execution that use virtual memory, not just those that execute transactions, so the Chang and Mergen suggestions became an anecdote in the prior art, as Woods said "No one seems to be looking at what they learned." An exemplary embodiment of the present invention uses a "transaction table" that is distinct from the virtual memory page tables of the system in combination with a data cache structure to store information associated with the speculative loads and stores.

Unknown to Woods, in the Chang and Mergen IBM Yorktown facility there had been ongoing laboratory developments relating to transactional memory systems, including the memory system described in U.S. Pat. No. 7,350,034 (hereinafter the "'034 patent"), filed Jun. 20, 2005, and entitled "Architecture Support of Best-Effort Atomic Transactions for Multiprocessor Systems".

The '034 patent describes a transactional memory system which focuses on using "caches as buffers for data accessed by atomic transactions". The '034 patent teaches forcing the failure of a transaction when the system detects a "buffer overflow" and does not propose dealing with the case of speculative data being evicted from the cache. A buffer overflow will result if too many transactional loads or stores target the same cache congruence class. The percentage of transactions which overflow the cache and fail will be proportional to the number of loads and stores contained in a transaction. Long transactions will fail more often.

Other systems have been proposed which use a cache to implement a conflict detection scheme, and to capture speculative data which overflows the cache. An exemplary embodiment of the present invention does not rely primarily on data cache states for conflict detection. The required specialized cache states cause an undesired increase in complexity and also make it difficult to add the required detection and isolation mechanisms to existing multiprocessor cache coherency designs. Nevertheless, there are numerous attempts to exploit the cache which have been tried, besides the approach described in the '034 patent. One approach is to use a "before-image log" and a cache coherency states to implement a conflict detection scheme. Another approach is described by Ananian, et al. in their paper entitled "Unbounded Transactional Memory" (Research Abstracts 2006, CSAIL Publications and Digital Archive) which describes a transactional memory system which uses a single "unsorted linear array data structure" to capture speculative data which overflows data caches. They use an extra bit per cache set, the "O" bit to indicate if that set has "overflowed", and another bit per cache entry, the "T" bit to indicate that the entry holds speculative data. The linear array data structure does provide the ability to support longer transactions but it does not provide the fast detection capability of exemplary embodiments of the present invention. The linear array in Ananian needs to be searched for any cache access that targets the set that "overflowed". This can be a long process for transactions that cause many overflows. Rajwar, Herlihy and Lai take a similar approach as Ananian in their paper entitled "Virtualizing Transactional Memory" (2005 IEEE). Rajwar, et al. also use a data cache as the primary mechanism to track the speculative state associated with transactions. Speculative data which is forced out of the caches is moved to the transaction address data table (XADT) overflow area in virtual memory. The detection of a possible conflict with an address that is part of the XADT requires a slow linear search of the XADT. Rajwar describes the use of filters to eliminate some of these searches but there are many cases where the searches will still need to be done.

In addition to the above summarized developments in the field, many software interfaces and instruction set modifications have been proposed for the support of transactional memory. The paper "Architectural Semantics for Practical Transactional Memory" (McDonald et al, Computer Systems Laboratory, Stanford University, 2006) compares some of the proposals and provides references for many others and is incorporated herein by reference in its entirety.

Many software interfaces and instruction set modifications have been proposed for the support of transactional memory. Exemplary embodiments of the present invention may be used in combination with any of them in order to provide high performance transactional memory operations without incurring a large increase in hardware or software complexity. An exemplary embodiment is described for the IBM PowerPC® architecture but anyone skilled in the art could apply the same approach to any other architecture such as IBM's zSeries®, IBM's pSeries® with the P3, P4, P5 processors, and even IBM's System 38 and its AS/400® can utilize the support of an exemplary embodiment of the present invention, as well as other computer systems, such as Sun Microsystems' SPARC®, and the Intel® IA-32, etc. Anyone skilled in the art could extend an exemplary embodiment for use with other application programming interfaces (APIs) that may be created for other specialized versions of transactional memory implementations.

An exemplary embodiment of the present invention uses a hardware bit or bits associated with all memory locations, not just those that are currently part of an active transaction. An exemplary embodiment uses the added hardware bit or bits to provide much faster execution of transactions than that which can be obtained using the process described n the '517 patent. An exemplary embodiment uses a data cache structure to hold old data states in conjunction with an improved transaction table as a log to optimize the memory usage and provides a system which uses less memory than would be used by other systems like that described in the '517 patent, yet an exemplary embodiment can execute applications developed for these other systems. An exemplary embodiment provides one or more PTRAN bits for every storage increment. There is no need in the current embodiment for an indirect method of "locating" the PTRAN bit. An exemplary embodiment provides a much faster indication of potential conflicts since the PTRAN bit is a directly addressable part of the memory location to be marked. An exemplary does not need an interface such as that described in the '517 patent, and achieves its benefit using hardware and firmware to update and reset the PTRAN bit. An exemplary embodiment does not require application software to be aware of the state of the PTRAN bit or bits although one may provide a direct interface if desired. An exemplary embodiment is also optimized for a short commit processing time. An exemplary embodiment does not require the use of a version number for each storage location.

An advantage of an exemplary embodiment is that it uses a "transaction table" that is distinct from the virtual memory page tables of the system. This enables very large transactions to be processed and provides conflict detection down to a single byte. An exemplary embodiment has no limit on the number of concurrent threads that can simultaneously access memory locations in the same virtual memory segment. An exemplary embodiment performs conflict detection on physical memory addresses (or real addresses) and only restricts simultaneous access at the granularity of this conflict detection. This granularity can differ for various implementations of exemplary embodiments but will typically be on the order of bytes. If the Chang and Mergen system tries to use large numbers of concurrent threads, that system could not provide similar benefits without using extremely large virtual page table formats and consequently incurring a performance penalty. An exemplary embodiment of the present invention does not impose this performance penalty. Another advantage of an exemplary embodiment is that old data states associated with speculative loads and stores is stored in a data cache structure located in cache, thus saving on any bandwidth and clock cycles required to move the old data states into the transaction table. If the data cache structure becomes full, the old data states are stored in the transaction table as a backup to the data cache structure.

Turning now to the drawings in greater detail, it will be seen that in FIG. 1 there is a computing system illustrating an exemplary embodiment of the present invention which has one or more microprocessors (100,101,102) coupled to a physical memory array (120) via an interconnection element (110). The microprocessors (100, 101, 102) include a cache 104 (also referred to herein as a "cache storage") and the caches 104 include a cache structure 106 for storing old data states associated with the transactions. In an exemplary embodiment, the cache structure 106 is a hardware buffer containing 32 cache lines. Other cache structures and number of cache lines may be implemented by exemplary embodiments and may be selected based on criteria such as application and system requirements. The physical memory array stores transaction data (121) and PTRAN tags (122) which are associated with every increment of real system memory. The interconnection element (110) can be implemented as a shared bus or crossbar switch. An exemplary embodiment applies to systems which use any other scheme of interconnecting physical memory to a multiprocessor system which may be implemented in one or more chips. The memory could be broken down into smaller portions and distributed across private connections to each of the central processing unit (CPU) chips as done for some IBM systems using the POWER4® microprocessor or for Amdahl's AMD Opteron® based servers. The microprocessors and memory controllers may be located together on a single silicon chip or they may be spread across multiple chips.

The physical memory of the computing system is divided into n increments. One or more (PTRAN) bits associated with every increment of real system memory are provided for each of the n increments. An exemplary embodiment allows for the choice of any memory increment size and the best choice will depend on workload characteristics, hardware costs, and data caching structure used in the target system. An increment of 16 bytes is used in the illustrated embodiment. The PTRAN bit(s) are used to indicate whether (or not) a data entry in memory is part of the speculative memory state of an uncommitted transaction that is currently active in the system.

Figures 6, 7:
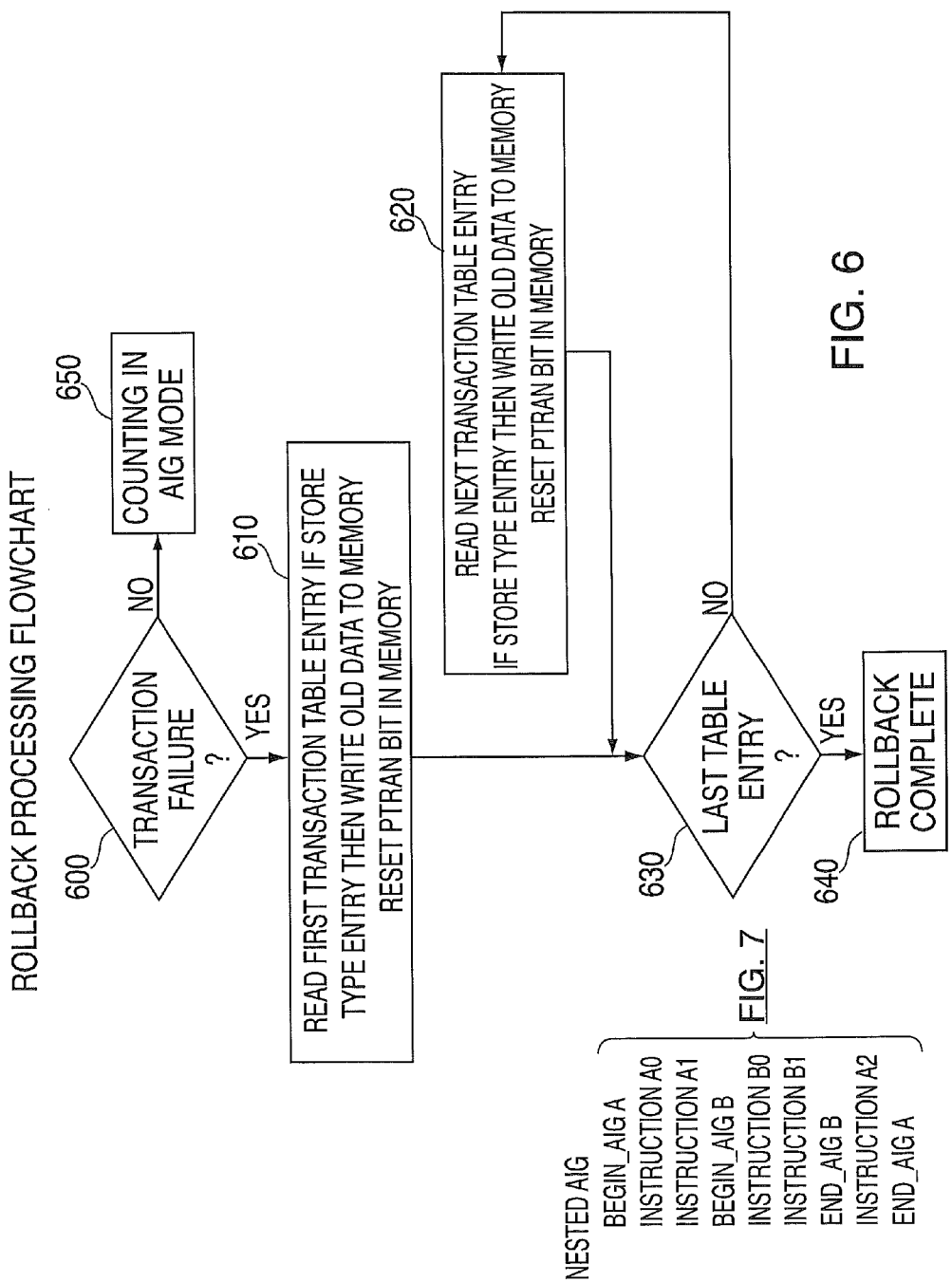
FIG. 6 illustrates a rollback processing flow that may be implemented by an exemplary embodiment.
FIG. 7 illustrates a generalized flowchart that shows the flow of decoding and execution of instructions in an exemplary embodiment.
Figure 7:
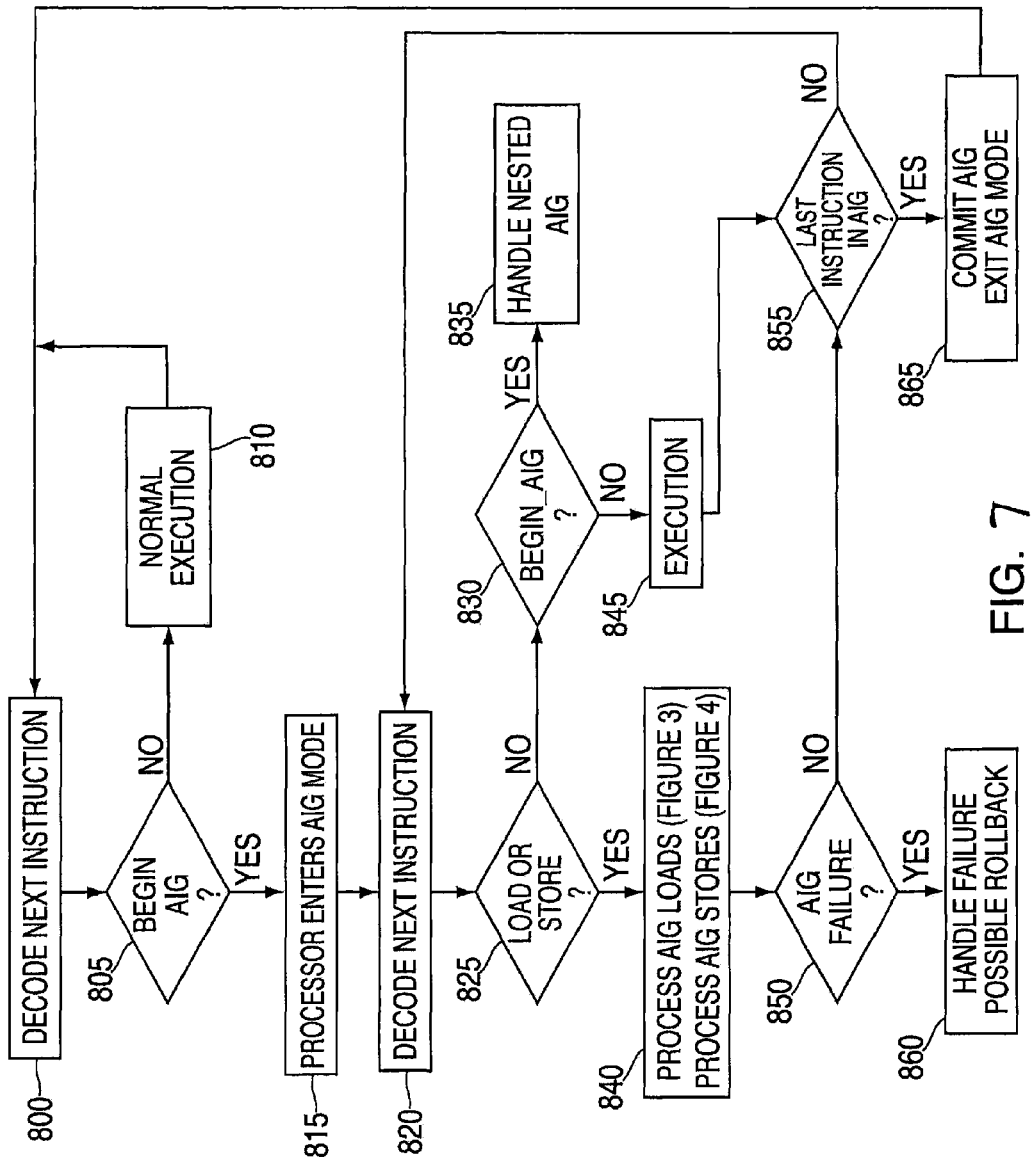

Special new instructions (BEGIN_AIG, END_AIG) as illustrated by the nested AIG code sequence of FIG. 7 are used to mark the beginning and end of a group of instructions. The instructions which execute between the special new instructions are referred to as an "atomic instruction group" (AIG) illustrated by AIG instructions shown in FIG. 7 (Instruction A0, Instruction A1, Instruction A2). Additional storage access rules are used when a processor is executing instructions which are part of an AIG. All of the storage locations modified by the AIG group of instructions are updated in memory in an atomic fashion. The updates to the storage locations are kept "pending" until the processor and/or software application indicates that they should be "committed". All of the updates are either committed to "normal" memory at once or they are discarded. The results are discarded when hardware and/or software detects a conflict between the storage accesses of multiple AIGs that are executing concurrently in the multiprocessor system. An exemplary embodiment provides a way for hardware to quickly detect potential conflicts between the storage accesses of multiple AIGs. Although an exemplary embodiment uses special new instructions to mark the boundaries of a transaction, any other method could be used to identify a group of memory locations that are to be updated in an atomic fashion. An exemplary embodiment is compatible with any number of software interfaces that may be used to implement a transactional memory system. An exemplary embodiment can provide the same fast conflict detection for any system which is attempting to provide an atomic update of multiple storage locations. An exemplary embodiment also applies to systems which mark the boundaries of an instruction group in any other ways, including compiler generated hints attached to other instructions, internal microprocessor commands generated by internal microcode or millicode.

A PTRAN tag (122) is one or more bits associated with an increment in memory which is set for all memory accesses generated by instructions that are part of an AIG. A processor inspects the bit before attempting to set it; this enables the quick detection of potential conflicts with other AIGs that are concurrently executing on other threads. The setting of the bit may be accomplished by a "test and set" (TS) operation of the IBM z/Architecture or any other equivalent operation that enables an atomic update in a multithreaded or multiprocessor system.

Figure 2:
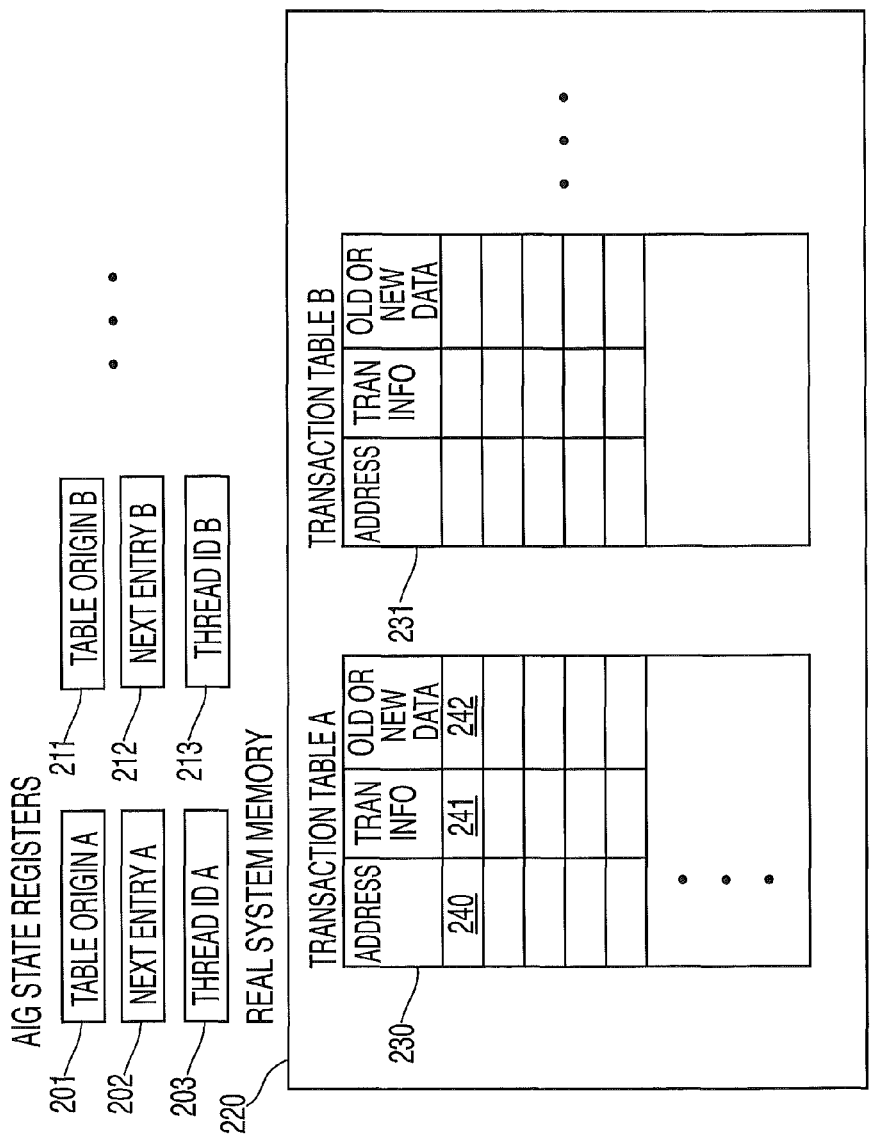
FIG. 2 illustrates real system memory transaction tables that may be implemented by an exemplary embodiment.

Turning now to FIG. 2, it will be seen that transaction tables (230,231) are created as part of the real system memory (220) (also referred to herein as "main storage") which is illustrated here as physical memory (120). The transaction tables (230, 231) could also created in logical or virtual memory. Any system to map the logical system memory to the physical system memory can be used, and there are numerous examples known in the art which can be used, such as those in the IBM zSeries, IBM pSeries, Sun Microsystems' SPARC, Intel's IA-32, etc. A transaction table entry is made when instructions that are part of an AIG cause a memory location to be inspected or updated. A thread identifier (203,213) is associated with each transaction table (230,231). A next entry register (202,212) is used as an index into the transaction table (230,231) and indicates which entry should be written next. A table origin (201,211) indicates the address of the first entry of the transaction table (230,231) for its thread (203, 213). The transaction table (230,231) is used to hold additional information beyond the simple information that is associated with the PTRAN tag bit or bits that are associated with the memory location that has been inspected or updated. This additional information is related to the speculative state associated with an AIG. In an illustrated IBM zSeries or pSeries CPU (100, 101, 102) embodiment which is described herein, a single PTRAN bit is utilized. In this case, the combination of the transaction table (230,321) and the cache structure (106) will contain all additional information about the speculative state (e.g., the combination will contain entries in an active mode for the AIG), therefore the PTRAN bit will only indicate that a physical address is involved in an AIG. This is illustrated for transaction table A (230) as the address (240), the transaction information identifier (241) and old or new data (242). As described herein, transaction table A (230) only contains the old data if the cache structure (106) cannot store the old data. This may occur, when the cache structure (106) becomes full. In this manner, the transaction table A (230) is used as a backup to the cache structure (106) for storing the old data states. Other embodiments may use additional PTRAN bits which can be used by hardware or software to speed the processing of certain events involved in the processing of AIGs or the speculative states of any other transactional memory system. The combination of using just a single bit in memory and associating that bit with a more complete description of the transactional state in the transaction tables combined with the cache structure provides a transactional memory system which requires very little hardware overhead without incurring the performance penalty seen in prior-art software transactional memory systems.

Turning again to FIG. 2, it will be seen that an entry in the transaction table, A for example (230), includes the address (240) that has been inspected or updated inside of an AIG, a transaction information field (241) and a data field (242). A store instruction that is part of an AIG will cause the system to copy the "old" data value, the old data state, from the original storage location to the cache structure (106) for that address and the new speculative data is placed in the main storage location (e.g., the physical memory (120)). If the cache structure (106) cannot store the old data state, then it is stored in the transaction table in the data field (242).

An exemplary embodiment can be made to work with the new values held in the cache structure (106) if desired. Placing the old data value in the cache structure (106) allows the system to be optimized for the case where most transactions are successful. The old data can be discarded quickly when it is no longer needed, when a transaction is committed permanently to memory, by changing the pointer to the cache structure (106) or by clearing the contents of the cache structure (106). The transaction information field 241 of a transaction table entry includes any transaction information that is needed to make detailed decisions about the need to cause a transaction failure. It also has provisions for additional information to allow efficient support of nested transactions, virtualized transactions or other extensions of the transactional memory architecture. In an exemplary embodiment, the transaction information field (241) includes an indication of whether the storage access of the associated address (240) was a load type access or a store type access. The transaction information field (240) can also indicate whether the address is shared among multiple AIGs in the system.

FIG. 3 shows a load processing flowchart for the actions for tracking a speculative state using the PTRAN bit and the transaction tables. When a processor attempts a load type access, initially a decision (310) is made to determine whether the load access address is part of an AIG and whether the special storage access rules for AIG accesses apply. If not, normal processing applies and a normal load processing (320) operation is followed. Whether or not a load type access is part of an AIG may be determined in many different ways in the decision process step (310). A mode bit may be set in the processor pipeline or in load/store units to indicate that a special AIG mode of operation is active. The mode may be part of the physical state of the processor or the logical state of a virtual processor. If the special mode of operation is not active then the load is treated as a normal load (320).

An "override" of this "AIG active mode" may be provided. The override could be associated with the logical memory segment or logical memory page which contains the target address. An override forces the system to treat the storage request as normal in spite of the fact that the request is part of an AIG. If the override is active then the result of the decision (310) will cause normal processing (320) to take place. Assuming that an AIG is active and the override is not, then the associated PTRAN bit is inspected at an inspection step (330). A load instruction inside of an AIG detects upon inspection the state of the PTRAN bit. When the PTRAN bit is already set (330) it is due possibly to the actions of another thread executing on the same processor or on another processor. If at the inspection step 330 it is found that the PTRAN bit is not set (340) then the processor sets the PTRAN bit and make a record of the access in the transaction table (230) for the active AIG by adding to the transaction table at the set PTRAN block (340) and then the complete load can continue (360). If the PTRAN bit is already set, the address which caused this potential conflict is compared with the addresses already entered in the processor's transaction table. If the PTRAN bit was set when tested at the inspection block (330) by another load earlier in the same AIG, it is already part of the AIG as tested and determined (350) and then the complete load may continue (360). Each transaction table (230, 231) contains the addresses for a particular AIG. Similarly, in an exemplary embodiment, each cache structure (106) contains old data states for a particular AIG. In an exemplary embodiment, each cache structure (106) corresponds to a transaction table and the same index is used for storing the old data states and the control information associated with each instruction being tracked in the AIG. Accordingly, if the address was not already part of the AIG as tested and determined (350) then the address for the load is not found in the processor's transaction table and then the processor checks whether the address is enabled for sharing among AIGs in a determination step for AIG sharing (370). If the address is not currently enabled for sharing among multiple AIGs, the processor may signal other processors in the system to request a "shared AIG access" for this address during the determination step whether sharing is allowed among AIGs (370). A shared access can be granted if no other AIG in the system has speculatively written the storage location. If the shared access is not granted then the AIG fails (380), otherwise (390) the load address is added to the transaction table (230) and the transaction information field (241) is updated to indicate that the address is a load access that is shared among multiple AIGs in the system.

Figure 4:
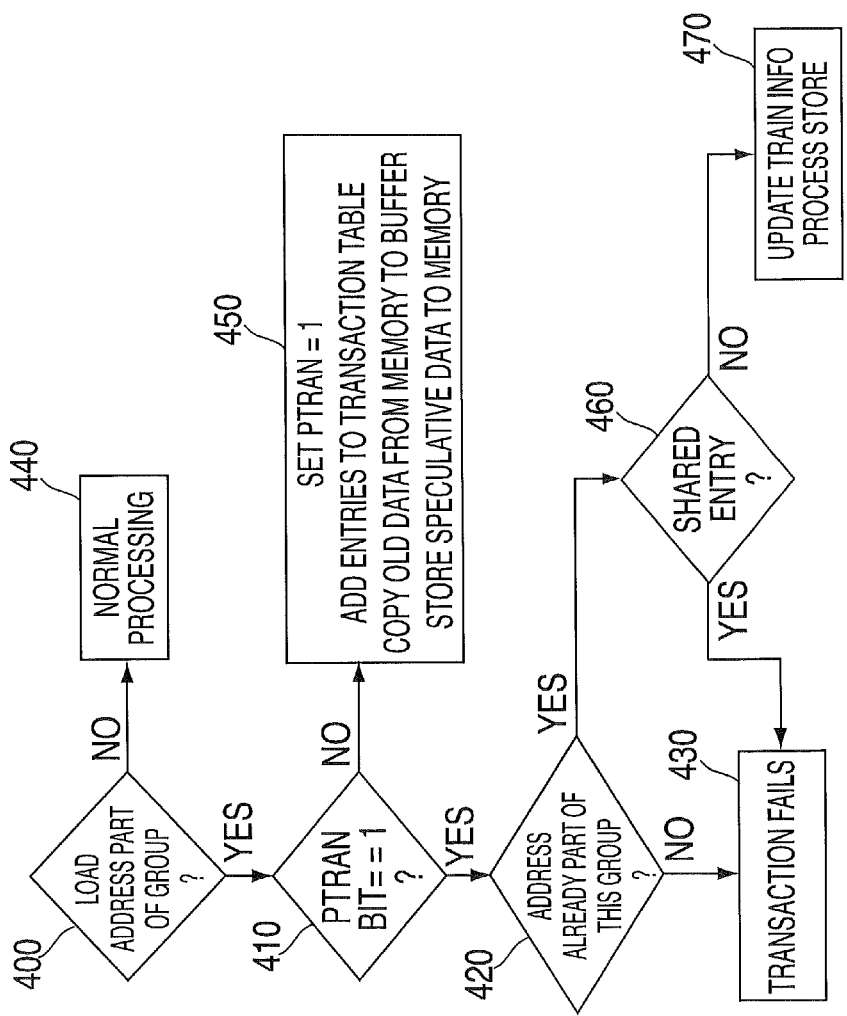
FIG. 4 illustrates a store processing flow that may be implemented by an exemplary embodiment.

The FIG. 4 store processing flowchart shows the actions for processing a store that is part of an AIG. When a processor attempts a store type access, initially a store decision (400) is made to determine whether the access is part of an AIG and whether the special storage access rules for AIG accesses apply. The mode of the processor is checked in a similar method as previously described for load accesses. If the special mode of operation, under which the special access rules for AIG accesses apply, is not active then the store is treated as a normal store (440). Assuming that an AIG is active, the associated PTRAN bit is inspected at the store process inspection block (410). If the PTRAN bit is not already set then the PTRAN bit is set at the store transaction step (450) and a new entry is added to the transaction table (230). The "old data" is moved to the cache structure (106), the address is written to the new entry (240) and the transaction information field (241) is updated. As described below in reference to FIG. 8, if the cache structure (106) is unable to store the old data state, then the old data state is stored in the data field (242) of the transaction table. The transaction information field (241) is marked to indicate that the access associated with this entry was a store type access. The new store data is written to memory after the setting of the PTRAN bit is completed. If the inspection of the PTRAN bit (410) indicates that the bit was already set then a decision (420) is made based on whether the current store address is already part of an AIG which is active on the processor. The transaction table (230) for the processor is examined, if it is determined that the address is present in the transaction table then the transaction information field (241) for the entry is checked and a decision as to shared access entry (460) is made. If the transaction information field (241) indicates that the entry is a load type access entry that is shared among multiple AIGs, the transaction fails (430) otherwise the transaction information field (241) for the associated entry is updated to indicate a store type access and the store is processed (470).

Figure 5:
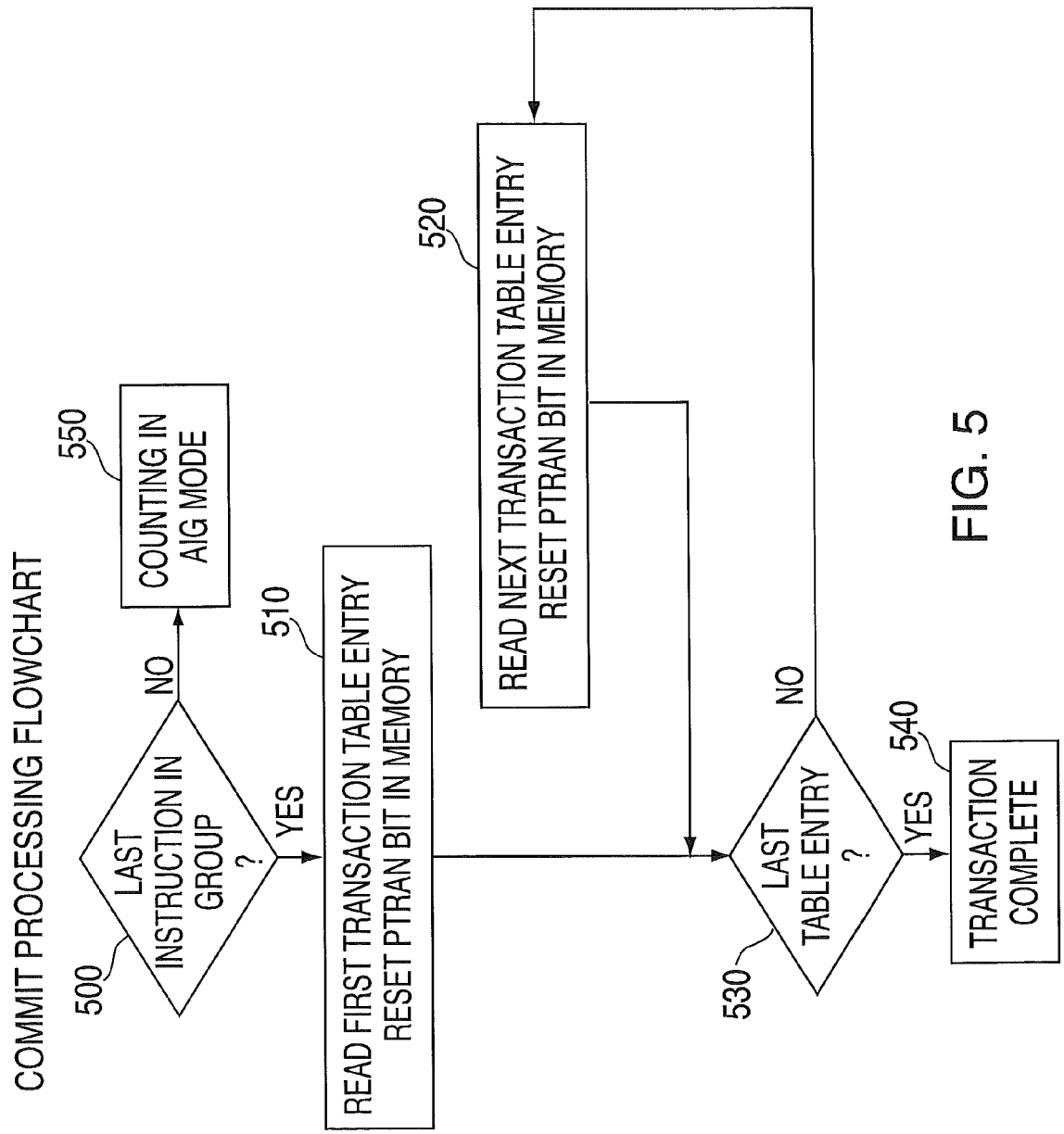
FIG. 5 illustrates a commit processing flow that may be implemented by an exemplary embodiment.

Turning now to the commit processing flowchart of FIG. 5, it will be seen that an exemplary embodiment includes a set of actions completed when the last instruction in an AIG has been processed and the entire group is ready to be "committed" permanently to memory as determined initially at a test step (500). If not, the processing continues in AIG mode (550). An AIG is committed to memory when the processing of the loads and stores of the AIG according to flowcharts from FIG. 3 and FIG. 4 does not result in a transaction failure. In the case of AIG success then testing (500) determines the last instruction in an AIG has been processed and the entire group is ready to be "committed" permanently to memory. Then, the transaction table is examined (510,520) and each entry for the AIG to be committed is read and its associated PTRAN bit is reset in memory at the transaction table commit step (530) determination.

A specialized hardware engine may be used to complete the performance of this commit operation. A combination of processor caches, multiprocessor coherency actions and an exemplary embodiment can be used to provide software with the illusion that all of the memory updates for a single AIG occur simultaneously even though the main memory storage arrays are not updated simultaneously. During the commit processing, the resetting of the PTRAN bits continues until the last valid entry in the transaction table has been determined to be reached (530). At this point the AIG is considered to be committed and the performance by the engine therefore completes (540).

Some conditions prevent the completion of an AIG. These conditions may be detected during load processing while executing an AIG (380) or during store processing while executing an AIG (430). There are many other possible processor conditions that may cause the need to abort the processing of an AIG. These include error conditions detected in the system as well as other conditions that would require significant additional hardware support to enable the processor to handle them correctly. Many prior-art transactional memory architectures include provisions for the abort of transactions and for a subsequent retry. Prior-art software constructs can be used together with an exemplary embodiment to eliminate the need to provide hardware to deal with all possible special cases. A simple example is the case of a timer interrupt in the middle of processing an AIG. The interrupt may cause the processor to spend a large amount of time running code that is not part of the partially completed AIG. It may not be desirable for the processor to keep the AIG active during this time. The system can force a transaction failure for any AIG that is currently executing when a timer interrupt occurs. A similar approach can be used for any other special case events occurring in the processor.

Transaction failures or forced retries are handled according to the process of the rollback processing flowchart for "rollback" processing shown in FIG. 6. Turning now to FIG. 6, it will be seen that the lack of a transaction failure condition (600) allows the processor to continue in the AIG active mode (650). An exemplary embodiment uses an "eager" policy with respect to detecting transaction failures and causing transaction rollback. Also, an exemplary embodiment may be used in systems that wait until the end of a transaction to take the actions required for a rollback. The memory updates executed as part of an AIG are either committed to normal main storage at the same time (FIG. 5) or they are discarded with a "rollback" operation (620-640).

Upon finding a transaction failure condition (600) failure several additional steps are required (610,620). Rollback transaction table processing entry steps provide that the transaction table (230) and the cache structure (106) for the AIG are inspected and any old data (or old data states) is written back to the main memory address (240) indicated in the entry. The PTRAN bit for the associated address is reset. The rollback processing (620) continues until the last valid entry in the table has been processed (630). After the last valid entry has been processed, the rollback is complete (640). The actions taken by the processor at this point will differ based upon various software architectures for transactional memory. Any transactional memory architectures described in the background may be used. In some cases the AIG will be retried from the beginning. In other cases special software handlers will be invoked to deal with the transaction failure. An exemplary embodiment may be used with any of these different architectures.

An exemplary embodiment supports the execution of "nested" transactions. A second AIG may be included within the scope of the first AIG as shown in FIG. 7. Each BEGIN_AIG special instruction (FIG. 7) statement causes the system to create a transaction table (230) and to associate the table with the AIG. Decisions about whether or not a storage address belongs to an AIG (350) may include the inner AIG (A) or the combination of the inner and outer AIGs (A & B). The END-AIG special instruction statement (FIG. 7) ends the transaction sequence, but as shown, a sequence for a specific transaction (transaction B) may be nested within another sequence (transaction A). The use of multiple transaction tables (230) may be used to support many nesting architectures for transactional memory. Multiple versions of the "old data", or the old data state, may be stored in any number of cache structures (106) or transaction tables (230) at any nesting depth. Prior-art transactional memory systems that rely on data caches to hold speculative states are unable to provide similar support for nested transactions without adding additional state information to cache directories and adding additional complexity to the cache coherency protocol. Nesting support on prior-art systems would impose a large hardware complexity penalty on those designs. An exemplary embodiment can also be extended to include a combined transaction table/cache structure that includes entries from both the inner AIG (Instruction B0, Instruction B1) and the outer AIG (Instruction A0, Instruction A1, Instruction A2). This combined transaction table/cache structure may be used in place of the individual transaction tables and cache structures, or in addition to the individual transaction tables and cache structures.

There are many additional hardware features that can be added to exemplary embodiments to speed the processing of the transaction table manipulations and the setting and resetting of the PTRAN bit(s). Since the PTRAN bit is part of the main storage data, it can be cached in the normal data caches of the system. The transaction tables are also part of main storage and can also be cached. As used herein the term "main storage" refers to an array of DRAM memory chips. Additional control information can be added to the data caches to indicate whether a specific address has been enabled for "shared AIG access" and therefore eliminate the need to search the transaction table for some cases.

The capabilities of exemplary embodiments of the present invention as described above can be implemented in software, firmware, hardware along with some combination of software, and firmware.

FIG. 7 shows the flow of decoding and execution of instructions in a computing system that uses an exemplary embodiment. An exemplary embodiment uses a BEGIN_AIG instruction to indicate the beginning of an AIG and an END_AIG instruction to indicate the end of an AIG. Any other suitable method of marking the beginning and end of a group of instructions can be used. The instructions or marks may be inserted in the code explicitly by programmers in a high level language or added by compilers or translators as implementations of high level locking functions. The instructions or marks may be added by a library function call or be included by a special event in a runtime environment. The instructions or marks may be generated by firmware, hardware or a combination of both as a response to decoding a particular sequence of instructions or receiving a special command to enter a new mode of execution.

An exemplary embodiment identifies the beginning of an AIG after decoding of an instruction (800). If it is determined that a BEGIN_AIG instruction has been decoded (805) the processor enters a new mode of execution, AIG MODE (815), otherwise the instruction is executed as usual (810) and processing continues with the next instruction (800).

Prior to entering AIG MODE, the architected state of the processor is saved in the same manner that a traditional program call is handled in the IBM Z-Series architecture. Any similar state saving mechanism may be used on any other processor architecture. The processor may return directly to this saved state if the AIG fails or may return to this state after a series of other error handling routines have been invoked. While in AIG MODE, decoding of instructions continues (820). If a load or store is decoded (825) then special handling of these loads and stores is required (840). The steps required for the processing of a load inside of an AIG are described in FIG. 3, those for a store inside of an AIG are described in FIG. 4. After loads and stores in an AIG are processed it is determined (850) whether there has been an AIG failure as described in the descriptions of FIG. 3 and FIG. 4. If there is a failure then special handlers are invoked (860). The actions of the special handlers for transaction failure may vary depending on the architecture of the system using the exemplary embodiment. Many methods of dealing with transaction failures have been described in the prior art, any of them could be used for this purpose. The possible methods include retrying the transaction from the beginning for a set number of attempts, waiting for the condition that caused the failure to change, calling specialized software routines to resolve conflicts among threads etc. These possible failure handlers may require the rollback of the AIG which caused the failure (860). If no failure was detected then it is determined whether the load or store was the last instruction of the AIG (855). If the instruction is the last instruction in the AIG then the AIG is committed (865) using the process described in FIG. 5. The processor then exits the AIG Mode and continues with the next sequential instruction after the AIG (800).

The decoding of instruction other than loads and stores inside of an AIG does not necessarily require special processing (830). If the instruction is not a load or store type instruction then it is determined whether the instruction is another BEGIN_AIG (830). Nested AIG instructions require special handling (835). The prior art contains many different ways of handling nested transactions. An exemplary embodiment can be used to support any of them. The nested AIG handler for an exemplary embodiment adds the instructions of the "inner" AIG to the "outer" AIG creating a single larger AIG. Other embodiments of the invention may provide different rules of processing for loads and stores that are part an inner nested transaction as well as special rules for the commitment and failure handling of inner nested transactions. If it is determined that the instruction is not a BEGIN_AIG then the instruction is executed (845) and it is next determined (855) whether the instruction is the last instruction of the AIG. The preferred embodiment uses the decoding of an END_AIG instruction to indicate that the last instruction of an AIG has been reached. If the last instruction of the AIG has been reached then the AIG is committed to memory and the processor exits the AIG MODE of operation (865).

Figure 8:
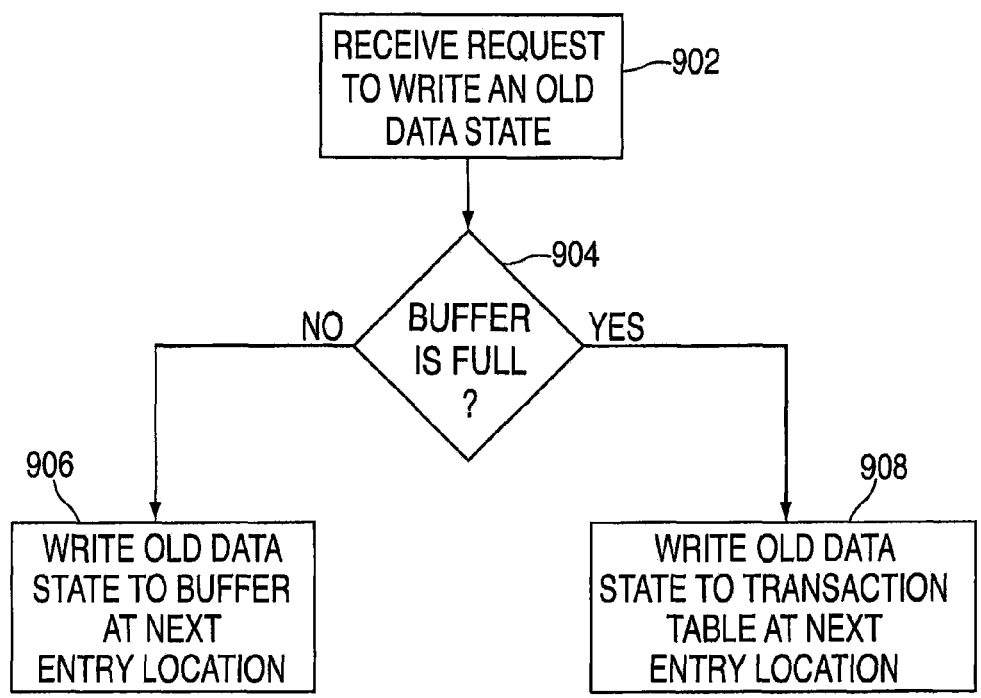
FIG. 8 illustrates an old data state store flow that may be implemented by an exemplary embodiment.

FIG. 8 illustrates an old data state store flow that may be implemented by an exemplary embodiment. At block 902, a request is received (e.g., from block 450 in FIG. 4) to write an old data state associated with an AIG to the cache structure (106).

As described previously, the cache structure (106) is located in cache storage (104); this provides for fast data access when writing and reading the old data states. In an exemplary embodiment, the cache structure (106) is a hardware buffer, however other software and/or hardware implementations may be implemented by exemplary embodiments. In an exemplary embodiment, a hardware buffer corresponds to a transaction table (230, 231) and there is one buffer (logical or physical) implemented for each transaction table (230,231). In this embodiment, the next entry register (202, 212) for the transaction table (230,231) may be utilized by the corresponding buffer for storing (and retrieving) the old data states. In another exemplary embodiment, one buffer is utilized by multiple transaction tables (230,231) to store the old data states. In this embodiment, a separate index is maintained for the buffer, and a correlation between old data states and addresses in a transaction table (230,231) is maintained.

At block 904, it is determined if the old data state can be stored in the buffer. In the embodiment depicted in FIG. 8, the old data state cannot be stored in the buffer if the buffer is full. In an exemplary embodiment, a bit in the control structure of the cache is utilized to indicate that the buffer is full. If the buffer is full, then block 908 is performed and the old data state is written to the transaction table at the location indicated by the next entry register (202,212) (i.e., same row in the transaction table as the corresponding address). A bit is set in the header of the transaction table to indicate that the old data state is located in the transaction table.

If the buffer is not full, as determined at block 904, then processing continues at block 906. At block 906, the old data state is written to the buffer.

In the embodiment depicted in FIG. 8, each transaction table has a corresponding buffer and the old data state is written to the buffer at the location indicated by the next entry register (202,212). A bit is set in the transaction table to indicate whether the old data state is located in the buffer or the data field 242 of the transaction table.

Technical effects and benefits include a high speed transactional memory system with much less overhead when compared to existing systems. In addition, bandwidth requirements and processing time are reduced by providing a cache location for storing old data states associated with speculative load and store instructions. Further, system reliability and availability is improved by using a transaction table in main storage as a back-up to the cache when the cache structure becomes full.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
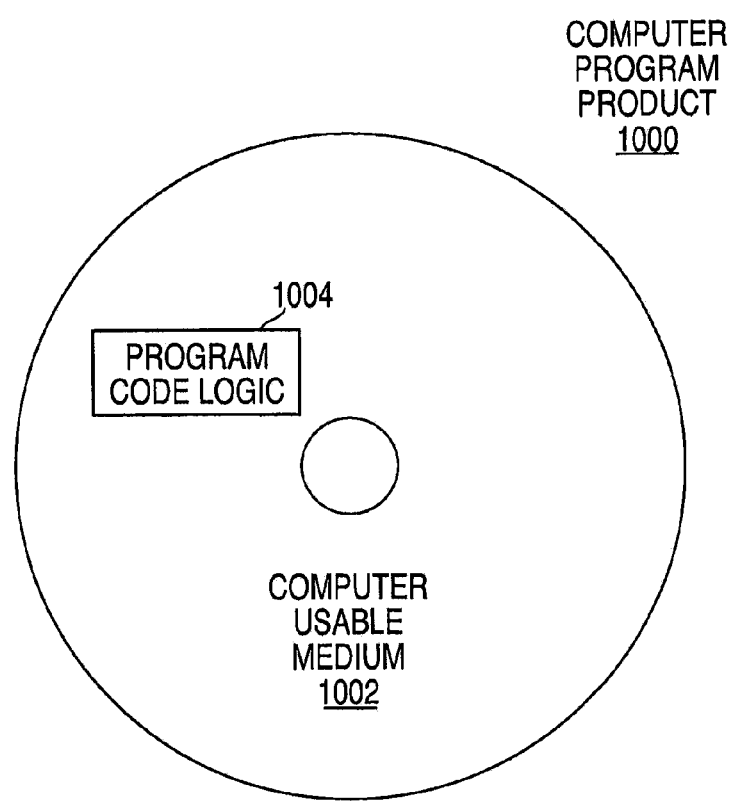
FIG. 9 illustrates a computer program product that may be implemented by an exemplary embodiment.

As described above, embodiments can be embodied in the form of computer-implemented processes and apparatuses for practicing those processes. In exemplary embodiments, the invention is embodied in computer program code executed by one or more network elements. Embodiments include a computer program product 900 as depicted in FIG. 9 on a computer usable medium 1002 with computer program code logic 1004 containing instructions embodied in tangible media as an article of manufacture. Exemplary articles of manufacture for computer usable medium 1002 may include floppy diskettes, CD-ROMs, hard drives, universal serial bus (USB) flash drives, or any other computer-readable storage medium, wherein, when the computer program code logic 1004 is loaded into and executed by a computer, the computer becomes an apparatus for practicing the invention. Embodiments include computer program code logic 1004, for example, whether stored in a storage medium, loaded into and/or executed by a computer, or transmitted over some transmission medium, such as over electrical wiring or cabling, through fiber optics, or via electromagnetic radiation, wherein, when the computer program code logic 1004 is loaded into and executed by a computer, the computer becomes an apparatus for practicing the invention. When implemented on a general-purpose microprocessor, the computer program code logic 1004 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer implemented method for use by a transaction program for managing memory access to a shared memory location for transaction data of a first thread, the shared memory location being accessible by the first thread and a second thread, the method comprising:
   executing at a computing system a string of instructions to complete a transaction of the first thread, beginning with one instruction of the string of instructions;
   determining at the computing system whether the one instruction is part of an active atomic instruction group (AIG) of instructions associated with the transaction of the first thread;
   based on determining that the one instruction is part of the active AIG, determining whether a private-to-transaction (PTRAN) bit associated with an address of the one instruction in a main memory of the computing system is set, the PTRAN bit being located in the main memory, the main memory comprising a plurality of memory increments, and each of the plurality of memory increments having a respective directly addressable PTRAN bit in the main memory;

based on determining that the PTRAN bit associated with the address of the one instruction in the main memory is not set:

setting the PTRAN bit of the address associated with the one instruction in the main memory;

adding a new entry to a cache structure and a transaction table, which together provide for entries in an active mode for the AIG, for the one instruction, the new entry including an old data state of the address of the one instruction stored in the cache structure and control information stored in the transaction table, wherein all addresses inspected or modified by instructions of the active AIG remain pending until the computing system indicates that the storage locations should be committed; and completing the one instruction as part of the active AIG; and executing at the computing system the one instruction under a normal execution mode based on determining that the one instruction is not part of an active AIG.

2. The method of claim 1, further comprising:
receiving a request to store the old data state;
determining whether to store the old state data in the cache structure or the transaction table;
storing the old data state in the cache structure in response to determining that the old data state should be stored in the cache structure; and
storing the old data state in the transaction table in response to determining that the old data state should be stored in the cache structure.

3. The method of claim 2, further comprising:
receiving a request to store the control information; and
storing the control information in the transaction table.

4. The method of claim 1, wherein the transaction table is located in the main memory of the computing system.

5. The method of claim 1, wherein the cache structure is located in cache storage of the computing system.

6. The method of claim 1, further comprising, based on determining that the PTRAN bit associated with the address of the one instruction in the main memory of the computing system is set:

determining, based on the transaction table, whether the address of the one instruction is already part of the active AIG;

based on determining that the address of the one instruction is already part of the active AIG, completing the one instruction as part of the active AIG;

based on determining that the address of the one instruction is not already part of the active AIG, determining whether sharing is enabled for the address of the one instruction;

based on determining that sharing among active AIGs is enabled for the address of the one instruction, completing the one instruction as part of the active AIG; and based on determining that sharing among active AIGs is not enabled for the address of the one instruction, aborting the active AIG.

\* \* \* \* \*